United States Patent [19]

Noble

[11] Patent Number: 4,840,425
[45] Date of Patent: Jun. 20, 1989

[54] VARYING SUPPORT CUSHIONED SEATING ASSEMBLY AND METHOD

[75] Inventor: Roger H. Noble, Fairfax, Okla.

[73] Assignee: Tush Cush, Inc., Liberal, Kans.

[21] Appl. No.: 40,634

[22] Filed: Apr. 21, 1987

[51] Int. Cl.⁴ .......................... A47C 7/46; A47C 27/10
[52] U.S. Cl. ........................................ 297/284; 5/453;
5/456; 297/DIG. 3; 297/460
[58] Field of Search ................. 297/284, DIG. 3, 460;
5/447, 449–453, 455, 456

[56] References Cited

U.S. PATENT DOCUMENTS

| | | | |
|---|---|---|---|
| 2,184,808 | 12/1939 | Balian | 5/450 |
| 2,719,986 | 10/1955 | Rand . | |
| 2,998,817 | 9/1961 | Armstrong . | |
| 3,008,465 | 11/1961 | Gal . | |
| 3,148,391 | 9/1964 | Whitney . | |
| 3,363,941 | 1/1968 | Wierwille . | |
| 3,608,961 | 9/1971 | Von Heck . | |
| 3,644,950 | 2/1972 | Lindsay, Jr. . | |
| 3,678,520 | 7/1972 | Evans . | |
| 3,867,732 | 2/1975 | Morrell . | |
| 4,017,118 | 4/1977 | Cawley | 297/284 |
| 4,175,297 | 11/1979 | Robbins et al. | 297/DIG. 3 X |
| 4,190,286 | 2/1980 | Bentley . | |
| 4,514,010 | 4/1985 | Gonzalez | 297/284 |
| 4,552,402 | 12/1985 | Huber et al. . | |
| 4,589,965 | 5/1986 | Isono . | |
| 4,592,588 | 6/1986 | Isono et al. . | |
| 4,619,481 | 10/1986 | Grudzinskas . | |
| 4,629,253 | 12/1986 | Williams . | |
| 4,634,179 | 1/1987 | Hashimoto et al. . | |

FOREIGN PATENT DOCUMENTS 1405778 11/1968 Fed. Rep. of Germany ... 297/DIG. 3
184365 12/1980 Japan ............................ 297/DIG. 3

Primary Examiner—Peter R. Brown
Attorney, Agent, or Firm—Robert E. Harris

[57] ABSTRACT

An inflatable cushioned seating assembly and method is disclosed, which assembly and method alternates the areas of supporting contact of inflatable portions of the assembly with the body of a user seated in the seating device while providing continuous overall cushioned support to the user to thereby reduce or alleviate medical problems and/or fatigue caused by prolonged seating. The assembly includes a plurality of first and second alternating sets of elongated inflatable compartments that extend across both the seat and backrest of a seating device, with each set substantially independently supporting the user when pressurized to a pressure greater than that of the other set. Selected compartments of each set may be varied in size and/or material for support of selected contours of the user's body, for example, the lumbar region of the spine, and the compartments extend beyond the front edge of the seat portion of the seating device. A control mechanism alternately causes inflation and at least partial deflation of each set of compartments, with inflation being caused to occur from the rear of the seat portion of the seating assembly forwardly and from the bottom of the back portion upwardly.

7 Claims, 3 Drawing Sheets

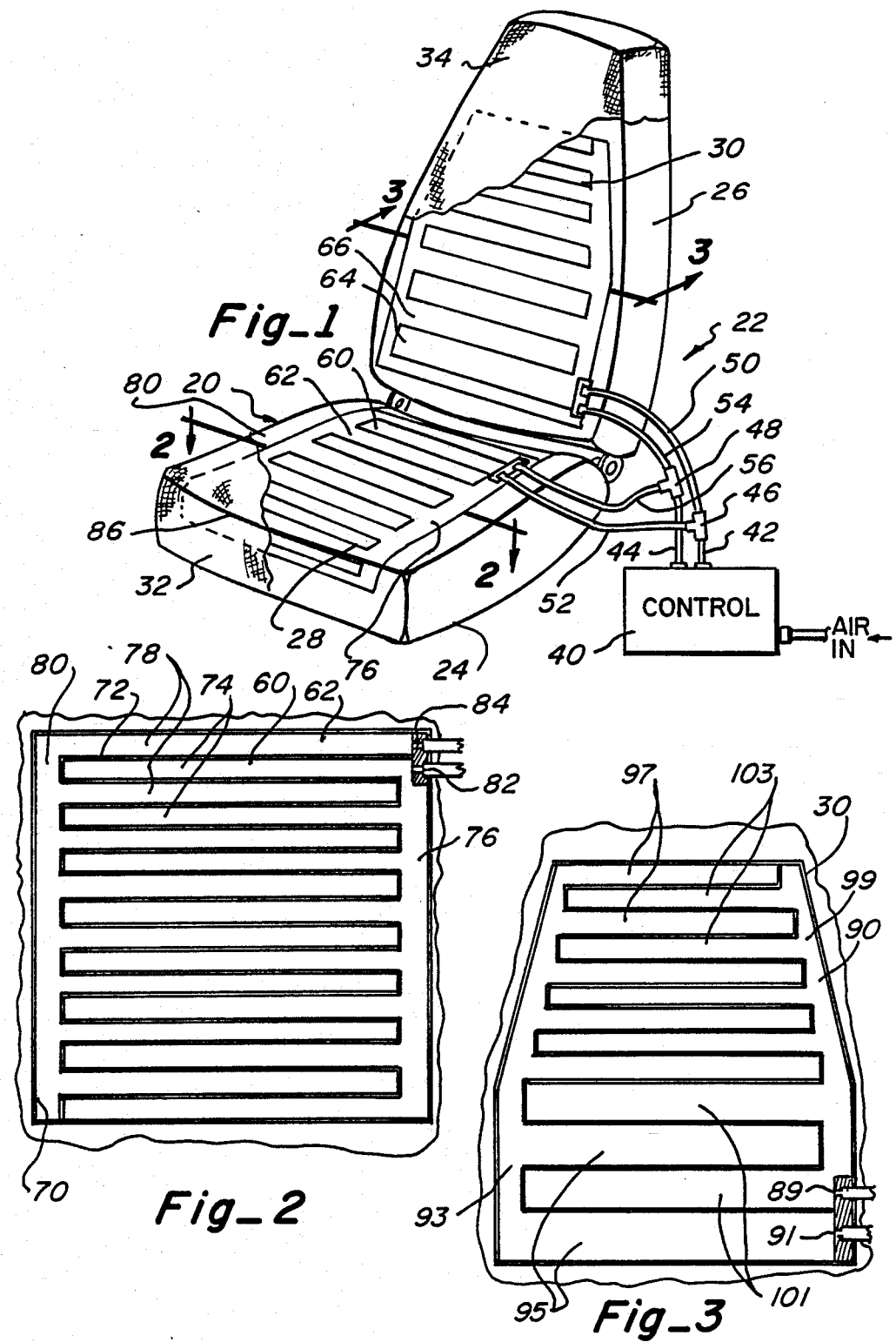

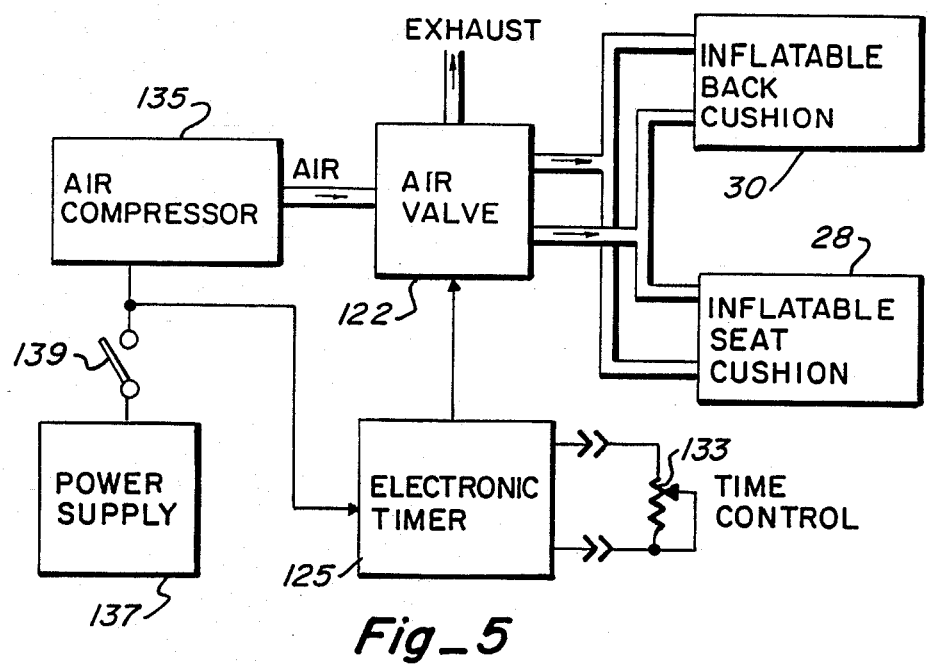
Fig_5
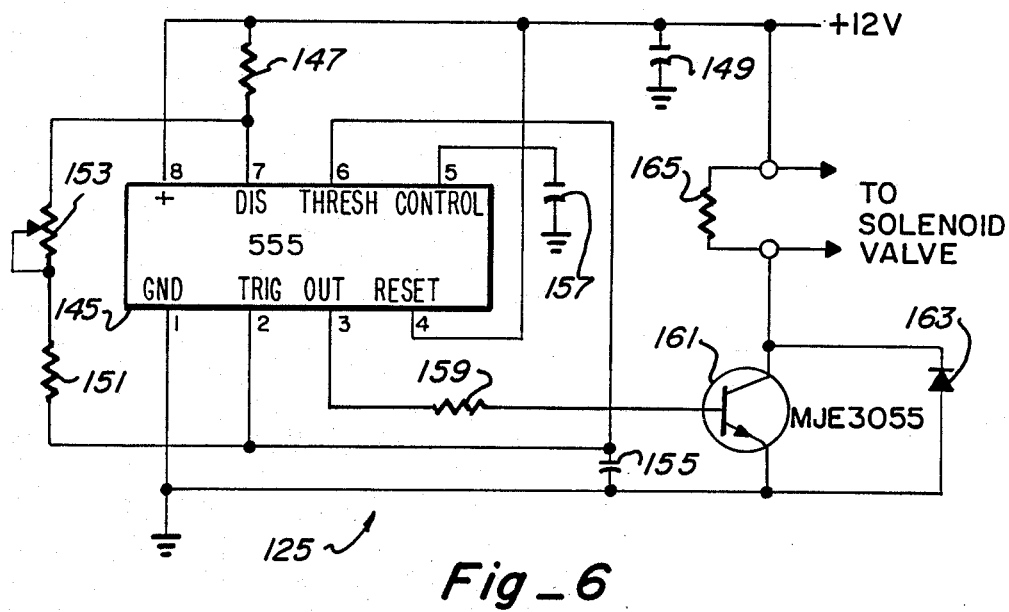
Fig_6

VARYING SUPPORT CUSHIONED SEATING ASSEMBLY AND METHOD

FIELD OF THE INVENTION

This invention relates to a cushioned seating assembly and method and, more particularly, relates to a varying support inflatable seating assembly and method.

BACKGROUND OF THE INVENTION

Inflatable cushioning assemblies for use with seating devices are well known. Some such assemblies of this type include separately inflatable compartments, compartments having varying capacity and/or shape to accommodate different users of such assemblies, and/or include means for attachment of the assembly to a motor vehicle battery, exhaust and/or air supply for control of such an assembly used in conjunction with a motor vehicle seat (see, for example, U.S. Pat. Nos. 2,998,817, 3,363,941, 3,608,961, 3,644,950, 4,190,286, 4,552,402, 4,589,695, 4,592,588, 4,619,481, and 4,634,179).

In addition, it has heretofore been suggested that inflatable cushioning assemblies include a plurality of tubes, which tubes are pulsed and/or alternately inflated and deflated, including inflating alternate ones of the plurality of tubes while deflating the tubes therebetween (see, for example, U.S. Pat. Nos. 2,719,986, 3,008,465, 3,148,391, 3,678,520, and 3,867,732).

It has also been heretofore suggested that such devices can include sets of tubes of different sizes (see, for example, U.S. Pat. Nos. 3,008,465 and 3,148,391), as well as aiding in medical problem discomforts and/or fatigue associated with long bed or seat contact (see, for example, U.S. Pat. No. 3,148,391), and it has been suggested that such devices can be utilized as seat cushions or for back support (see, for example, U.S. Pat. Nos. 3,008,465, 3,148,391, and 3,867,732).

Thus, while various arrangements for inflatable cushion assemblies for seating devices have heretofore been suggested and/or utilized, further improvements, as suggested herein, can nevertheless be utilized.

SUMMARY OF THE INVENTION

This invention relates to a cushioned seating assembly and method which is capable of alternating the areas of supporting contact of portions of the assembly with the body of a user seated in the seating device while providing continuous overall cushioned support to the user to thereby reduce medical problems and/or fatigue caused by prolonged seating.

The assembly includes a plurality of first and second sets of inflatable compartments preferably positioned substantially parallel to each other and normally perpendicular to the spine and lower extremities of a user seated in the seating device, with each set of compartments being capable of substantially independently supporting the user when pressurized to a pressure greater than the other set. Selected compartments of each set may be varied in size and/or material for support of selected contours of the user's body, for example the lumbar region of the spine, and the compartment sets are preferably made to extend past and downwardly over the front edge of the seat portion of the seating assembly.

A control mechanism is also provided to alternately cause inflation and at least partial deflation of each of selected sets of compartments at selected intervals, with inflation being caused to occur from the rear of the seat portion of the seating assembly forwardly and from the bottom of the back portion of the seating assembly upwardly, to thereby enhance the effects realized by alternating the areas of supporting contact of the seating assembly with the body of a user.

It is therefore an object of this invention to provide an improved varying support cushioned seating assembly and method.

It is another object of this invention to provide an improved inflatable cushioned seating assembly for supporting a body.

It is another object of this invention to provide an improved inflatable cushioned assembly for seating devices having a back portion and a seat, or bottom, portion.

It is still another object of this invention to provide an inflatable cushioned seating assembly capable of being variably inflated in a particular direction to thereby alternate the areas of supporting contact of inflatable portions thereof with the body of a user seated in the assembly.

It is still another object of this invention to provide an inflatable cushioned assembly having inflatable compartments with some inflatable compartments varying in size and/or material for support of selected contours of the body of a user.

It is yet another object of this invention to provide an improved cushioned seating assembly having a front portion that extends beyond and downwardly over the front edge of the seat portion of the seating assembly.

It is still another object of this invention to provide a varying support cushioned seating assembly and method to aid in alleviating problems due to prolonged seating.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of an inflatable cushioned support assembly in accordance with this invention and illustrated as a vehicle seat;

FIG. 2 is a sectional view taken along section lines 2—2 of FIG. 1 diagrammatically illustrating the arrangement of inflatable chambers in the seat portion of the seating assembly;

FIG. 3 is a sectional view taken along section lines 3—3 of FIG. 1 diagrammatically illustrating the arrangement of inflatable chambers in the back portion of the seating assembly;

FIG. 5 is a schematic diagram of a control system for the inflatable cushioned support assembly in accordance with this invention which includes internal power fluid pressure sources; and FIG. 6 is an electrical schematic diagram of a typical valve timer usable in the control systems of FIGS. 4 and 5.

DESCRIPTION OF THE INVENTION

Figure 4:
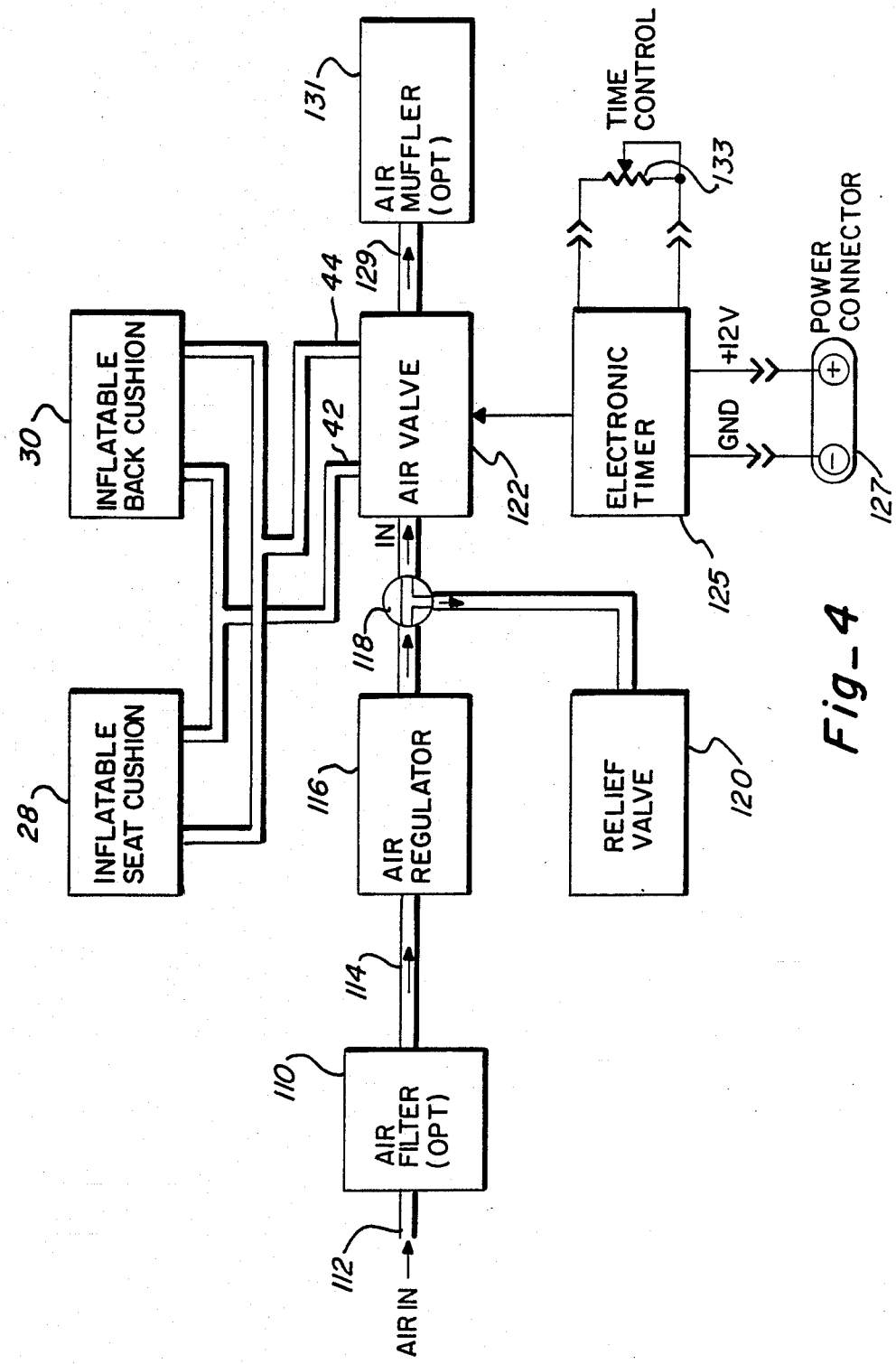
FIG. 4 is a schematic diagram of a control system for the inflatable cushioned support assembly for use in association with existing power and fluid pressure sources.

Referring now to the drawings, an inflatable cushioned seating assembly 20 is shown in FIG. 1 in association with a vehicle seat 22 that includes a seat, or bottom, portion 24 and a back portion, or backrest, 26. While a vehicle seat is shown with a pivotable back portion, it will be obvious to a person skilled in the art that support assembly 20 could also be used with any type of vehicle seating arrangement, or with other seating devices, including chairs, wheelchairs, lounges, and the like, and could also be used with seating devices having integral backrests and seats, or, in some instances, with no backrest at all.

As shown in FIG. 1, cushioned support seating assembly 20 includes seat support cushion 28 and back support cushion 30. While two cushions are shown, it should be realized that a single continuous cushion could also be utilized. Cushions 28 and 30 are shown maintained on seat portion 24 and back portion 26 by seat covers 32 and 34 (partially shown in FIG. 1), but could be maintained thereon in any conventional fashion (such as by straps or the like), or cushions 28 and 30 could be formed as a part of the seat assembly itself. When positioned on a vehicle seat, both the seating portion and the back portion of the seating assembly are positioned so that a user engages (directly or through a seat cover or the like) outer surfaces of the seating assembly adjacent to the user when so seated.

Control assembly 40 controls inflation and at least partial deflation within cushioned support assembly 20, and is connected with the interior of the support assembly through supply/exhaust lines 42 and 44, each line 42 and 44 being separately connected through T-fittings 46 and 48 to branching lines 50 and 52, and 54 and 56, respectively. As shown, the supply lines separately feed the inflatable tubular sets 60 and 62 of seat support cushion 28, and 64 and 66 of backrest support cushion 30. The separate inflatable portions, as well as the cushions themselves, may be formed of any flexible plastic material, or of vulcanized rubber, neoprene, and/or adhesive sealants.

Referring now to FIG. 2, a sectional view showing the construction of the seat support cushion 28 is shown. Inflatable seat support cushion 28 is formed from a pair of sheets of material configured in the general outline of the seat portion of the seating device and the sheets are sealed at the edge portions 70 and at the chamber separation seams 72. While only the bottom sheet of the seat support cushion is shown in FIG. 2, it is of course to be realized that the top sheet (as shown in FIG. 1) is identical in order to form the inflatable support cushion. The inflatable chambers and cushion edges may be sealed by any of numerous manufacturing techniques now known, including impulse bonding, electromagnetic bonding, magnetic heat sealing, friction joining, mechanical fastening, radio frequency bonding-embossing, thermal sealing, and/or ultrasonic assembly.

As shown in FIGS. 1 and 2, each tubular set 60 and 62 is an inflatable tube, or chamber, with tubes 74 of one set 60 being in communication with one another through passage, or manifold, 76 at one side of the seat portion, and tubes 78 of the other set 62 being in communication with one another through passage, or manifold, 80 at the other side of the seat portion. Passage 76 communicates with control assembly 40 through reinforced inlet channel 82, line 52, T-fitting 46 and line 42, while passage 80 communicates with control assembly 40 through reinforced inlet channel 84, line 56, T-fitting 48 and line 44.

The elongated inflatable tubes, or chambers, 74 and 78 are arranged in a substantially parallel alternating arrangement which, in usage on a seating device, would normally be substantially perpendicular to the saphenous veins and nerves extending down the lower extremities of a person sitting on the seat cushion. It should also be noted that seat support cushion 28 (including tubes 74 and 78) extend beyond the front upper edge 86 and downwardly therefrom. This is particularly beneficial to a user such as a vehicle operator.

The degree to which each chamber 74 or 78 is inflated is directly related to the thickness of the material employed in construction of the cushion, its modulus of elasticity, the distance between parallel seams 72 and the input fluid pressure. While two sets of elongated compartments are normally arranged as shown herein in FIG. 2 (and as later described in FIG. 3), it should be realized that the any number of sets of compartments may be configured as may be deemed desirable for any specific application. The number of chambers 74 and 78 can be any number from the minimum number necessary so that chambers 74 or 78 will cooperatively support a user of the cushion substantially independently of inflation of the other of the chambers, to a maximum number dictated by the material and manufacturing practices and specifications for forming the minimum widths of each discreet chamber.

In practice, a fluid, normally air, is first supplied through control assembly 40 to inlet 84 through line 44, T-fitting 48 and line 56 for inflation of chambers 78 through manifold 80 (which, as shown extends normal to chambers 78 along one side of the seat portion of the seating assembly). This establishes movement of the inflated chambers relative to the uninflated or partially deflated chambers. During periods of inflation of chambers 78, chambers 74 remain at least partially deflated.

As can be appreciated from FIGS. 1 and 2, the air is introduced at the back, or rear, of the seat portion of the seating assembly to first inflate the rearmost positioned chambers, and then progressively toward the front portion to progressively fill each chamber positioned from rear to front in the seat portion. This is beneficial to a user sitting in the seating assembly since the tubes, when filled from rear to front, act downwardly on the legs (i.e., toward the feet) in what might be described as a "milking" action.

With chambers 78 inflated and chambers 74 at least partially deflated, a user of the seat support cushion is thereby supported by chambers 78 substantially independently of chambers 74.

After a selected interval under the control of control assembly 40, inflatable chambers 74 are then inflated through inlet 82 (with each chamber 74 being progressively inflated from rear to front of the seat portion through manifold 76 (which extends normal to chambers 74 along the other side of seat portion of the seating assembly). During this time, chambers 78 are simultaneously allowed to at least partially deflate through inlet 84 and the lines associated therewith. Chambers 74 then provide the necessary support to then complete the cycle, so that during the cycle the areas of contact of the seat support cushion with the user's body are altered to thus relieve impingements and pressures to the user's body.

Each cycle is caused to reoccur at selected intervals. In this manner, long periods of confinement in a seating device are made less discomforting, fatigue is reduced, and blood circulation in the body is promoted. In this manner, many common problems related to long term seating can be reduced, or alleviated. Such problems, for example, for truck drivers include back problems, knee problems, kidney problems, hemorrhoids, general lower extremity muscle fatigue, exhaustion, and blood circulation related problems.

It is known that veins that carry blood in humans are cylindrical in shape like the arteries, but their walls are thin and they collapse when the vessels are empty. They also have valves built into their interior since slight constrictions at intervals over the vein tends to interrupt the uniformity of their surface and therefore blood flow. The superficial cutaneous veins are located between the layers of the superficial fascia immediately beneath the skin and returns the blood from these areas to the deeper veins by perforating the deep fascia. These veins in turn return the oxygen depleted or venous blood from the body generally to the right atrium of the heart. The popliteal vein feeds the small saphenous vein which runs alongside the sural nerve and down the back of the leg. The superficial veins of the lower extremity including the great and small saphenous veins and their tributaries are attached to a multitude of capillaries. When a person sits for a long period of time, pressure on the cutaneous veins will tend to block blood flow back to the heart. Unless the person squirms a lot in his seat, shifts to and fro on the cushion, or gets out of his seat at regular intervals, then the results could cause the lower extremities to become reduced in function. Not only is this a discomfort to the person, but in the case of the vehicle driver, could endanger proper operation of the vehicle.

In addition, numerous nerve fibers can elicit an action potential triggered by a pressure point between the body and seat cushion. This can cause the surrounding muscle tissue to contract and fatigue further reducing blood flow and could result in the familiar "charlie horse" muscle spasm. Additionally, if the selected intervals are of a short period (for example, from one to five second intervals) massaging of the appendages in contact with the cushion is experienced by the user.

While FIG. 2 shows two fluid supply lines, it should be realized that manifolds 70 and 76 could be removed from the assembly and each separate chamber be provided with individual supply inlets which could be sequenced or cycled in the same manner. In addition, separate serpentine flexible tubes distributed throughout the chair seat could be used to provide the same type of effect.

As more fully set forth hereinafter, the selected intervals can be adjusted from an upper rate where the inflation and at least partial deflation of the separate chambers fail to provide separate and different support surfaces to the occupant of the seating device, to extended times where the surrounding muscle tissue on the bottom of the seat of an occupant begins to contract and fatigue and blood circulation is reduced (although a preferred range of intervals from one second to sixty seconds is found most desirable).

Turning now to FIG. 3, the construction of backrest support cushion 30 is shown, which is, in most respects, similar in construction and function to the seat support cushion heretofore described (except as distinguished hereinafter). A pair of sheets 90 (only the bottom one of which is shown in FIG. 3) are formed into the shape of the backrest of the seating device and secured together as previously described. Supply/exhaust lines 50 and 54 provide for insertion and removal of fluid into and out of inflatable portions 64 and 66, respectively, through reinforced inlet channels 89 and 91.

Inflatable portion 66 includes side passage, or manifold, 93 which extends along one side of the back portion and connects inflatable chambers 95 and 97 with channel 91. Inflatable portion 64 includes side passage, or manifold, 99 which extends along the other side of the back portion and connects inflatable chambers 101 and 103 to channel 89. The inflatable chambers are arranged parallel to each other and are laid out in alternating fashion so that when chambers 95 and 97 are inflated (and chambers 101 and 103 at least partially deflated) they will cooperatively provide support to the back of the user independently of chambers 101 and 103, and with chambers 101 and 103, when inflated, being, likewise, able to provide such support independent of chambers 95 and 97 (when at least partially deflated). As shown, the chambers are normally arranged to be substantially perpendicular to the spine of a user.

Chambers 95 and 101 are positioned for placement near the lumbar portion of the spine of the user, and have a larger diameter (when tubular in configuration) than chambers 97 and 103. Chambers 95 and 101 are thus constructed so as to allow them to expand to a greater degree than chambers 97 and 103, thereby providing additional support to the contour of the body of a user in the lumbar region of the lower back of the user. Such chamber size variation could also be employed at other locations to support selected body contours as desired.

In addition, chambers 95 and 101 are inflated prior to inflation of chambers 97 and 103 (i.e., inflation progresses upwardly from the bottom of the backrest) to provide an upwardly traveling pressure application to a user seated in the device with the back of the user in engagement with the backrest.

As heretofore described with respect to the seat portion of the seating assembly, the alternating inflation and at least partial deflation of the connected chambers provides different body contacting surfaces for selected intervals of time promoting blood circulation and, where the intervals are relatively short, gentle massaging action to a user seated in the seating device.

As shown in FIG. 1, the supply/exhaust line 50, 52, 54 and 56 are paired through T-connectors, or fittings, 46 and 48 to main supply and exhaust lines 42 and 44 so that seat support cushion 28 and backrest support cushion 30 are operated from commonly utilized supply and exhaust lines for each separate inflatable portion (60 and 62 of cushion 30, and 64 and 66 of cushion 28).

FIG. 4 illustrates a control system for the inflatable cushioning support assembly powered from an internal air compressor system, such as may be found on large trucks, farm tractors, or earth moving equipment, typically used to actuate the brake systems thereof. Such internal air compressors are typically internally regulated to between 90 and 120 pounds per square inch of fluid pressure. While a hybrid electrical and mechanical system is shown in FIG. 4, it should be realized that a totally mechanical system could also be employed.

When using the internal air compressor system of such a vehicle, the pressure used to inflate support cushions 28 and 30 must be regulated. The support cushions are typically made of a relatively thin material, approximately 0.005 inches to 0.040 inches thick, depending upon the type of material. Therefore, the pressure used to inflate the chambers shown in FIGS. 2 and 3 will typically be relatively low, ranging between 1 pound and 5 pounds per square inch, depending upon the weight of the occupant of the seating device and the materials used to construct the cushions.

Referring to FIG. 4, air is supplied to an optional air filter 110 through air line 112 in order to remove any contaminants from the air which may be present in the vehicle air tank. While the air filter is not necessary to the operation of the cushion support assembly of this invention, it will extend the life of the assembly. Filtered air is then connected through line 114 to regulator 116 for reducing the supply pressure to the desired range. The regulator can be either a fixed pressure regulator or may be adjustable in order to accommodate the variable weights of different users.

The output of the air regulator is connected through tee 118 to relief valve 120 and air valve 122. Valve 122 may be any of a number of commercially available valves, including, for example, a four-way valve which has a spring return and an electrically operated solenoid. Timer 125, connected with electrical power through power-in connector 127, is connected to the solenoid of valve 122 so that, when a voltage is received at the solenoid, air flow from tee 118 will be caused to exit one of the valve outlets to line 42. Simultaneously, the valve will allow exhaust of air through line 44 and subsequently through exhaust line 129 and optional noise dampening muffler 131. In this manner, for example, chambers 74 of seat support cushion 28 and chambers 101 and 103 of backrest support cushion 30 will be inflated while the remaining chambers will be allowed to at least partially deflate (as shown in FIGS. 2 and 3).

After the selected interval of time (as selected by time control variable resistor 133), zero volts will be supplied by timer 125 to the solenoid of valve 122, and the air supply will exit the valve through line 44 for inflation of chambers 78 and 95 and 97 of the cushions, while the remaining chambers are allowed to exhaust through line 42, valve 122, and through exhaust line 129 and muffler 131. In this fashion, the voltage supply from timer 125, ranging from zero volts to +E volts, will cause air to be diverted through either line 42 or 44 and to be exhausted from the other line 42 and 44 in an alternating fashion at selected intervals.

Relief valve 120 is preset to a pressure less than the rupturing pressure of the seat and back cushions 28 and 30 and is provided a safety outlet in cases where regulator 116 may be misset or malfunctions. If the air pressure at the output of regulator 116 exceeds the preset pressure of relief valve 120, air will exhaust through the relief valve.

FIG. 5 illustrates a control system for the inflatable cushioning support assembly which includes a small portable air compressor 135 for providing fluid pressure to the seat and back support cushions 28 and 30. An air filter, regulator and relief valve, as shown in FIG. 4, are not necessary in this arrangement. Air compressor 135 is selected for providing a maximum pressure below the bursting pressure of the seat and back cushions. Operation of this system is similar in other regards to that of the system described in FIG. 4.

The power supply 137, indicated in FIG. 5, may be a vehicle battery (as would also typically be the case in the system described in FIG. 4), a rechargable battery with an internal or external charger for wheelchairs, normal office or production chairs and the like, or a 110 volt line current supply. As shown in FIG. 5, on/off switch 139 is normally also provided.

One example of an electric timer device for use in the control systems of FIGS. 4 and 5 is shown in FIG. 6. While the specific timer shown has been found to be useful, it should be realized that any number of devices for switching of the solenoid and valving arrangement shown in FIGS. 4 and 5 could be employed, including manual switching or resettable clock-type systems. As shown in FIG. 6, electric timer 125 may be used for driving the solenoid of the four-way type valve described with respect to FIG. 4 having a spring return for the internal valve piston, or could be used with a double solenoid valve with indent stops with slight modifications of the electrical driver circuit herein shown.

As shown, timer 125 utilizes a standard 555 timer 145 (a symmetrical astable timer) whose time is set to vary from about one second to about one minute. As also shown in FIG. 6, timer 145 has pin 7 connected with the +12 volt power supply through resistor 147 (the +12 volt power supply line is also connected with ground through capacitor 149), has pins 2 and 6 connected with resistor 147 through series connected resistor 151 and variable resistor 153 (pins 2 and 6 are also connected with ground through capacitor 155), has pin 5 connected with ground through capacitor 157, and has pin 3 connected through resistor 159 to the base of transistor 161 (having diode 163 connected across the emitter and collector).

The output from the collector of transistor 161 is connected as the output to the solenoid valve (with the output having a resistor 165 connected thereacross). When used in a 12 volt system, the output drives a four-way solenoid valve, as indicated in FIGS. 4 and 5, and therefore provides either a +12 volt or zero volt power to the valve in alternating sequence for the set period of time selected.

As will be appreciated from the foregoing, an inflatable cushioned support seating assembly is provided which is capable of periodically varying the body contacting surfaces of the support cushions in contact with the user of the seating device to thereby reduce fatigue and promote blood circulation for a user confined to such a seating device for long periods of time. It should be appreciated that the cushioning assembly can be attached to the seating assembly in varying manners including incorporation into the seating assembly at the time of manufacture, or by various retrofitting techniques such as attachment by straps, seat covers and the like.

What is claimed is:

1. In a seating device having a seat unit and a back unit, an assembly for providing varying cushioned support to the body of a user seated on said device, said assembly comprising:

first and second sections, said first section having front and rear portions and being positionable adjacent to said seat unit of said seating device, and said second section having upper and lower portions and being positionable adjacent to said back unit of said seating device, each of said portions of said first and second sections including a plurality of adjacently positioned support members each of which has a support surface with said support surfaces being positionable to support different areas of the body of a user when seated on said seating device, and at least selected ones of said plurality of support members of said portions of said first and second sections including movement establishing means for causing movement of said support surfaces of said selected ones of said plurality of support members relative to adjacent support surfaces of the others of said plurality of said support members with movement of at least some of said support surfaces of said selected ones of said plurality of support members in said rear portion of said first section and said lower portion of said second section occurring prior to movement of said support surfaces of said selected ones of said plurality of support members in said front portion of said first section and said upper portion of said second section and with at least one of said selected ones of said plurality of support members adjacent to said lower portion of said second section being configured so that said support surface of said at least one of said selected ones of said plurality of support members adjacent to said lower portion of said second section is movable a greater distance toward a user seated in said seating device than said support surfaces of others of said plurality of support members whereby support is provided to the lumbar region of the spine of a user seated on said device, and each of said first and second sections including input means and transmitting means connected between said movement establishing means and said input means, with said input means of said first section being positioned in said rear portion of said first section and said input means of said second section being positioned in said lower portion of said second section; and control means connected with said input means of both of said first and second sections for periodically causing movement of said movement establishing means to thereby vary the areas of support provided to the body of a user when seated on said seating device and to cause massaging action by said support surface of said at least one of said selected ones of said plurality of support members adjacent to said lower portion of said second section to thereby relieve discomfort at said lumbar region of the spine of a user seated on said device.

2. The assembly of claim 1 wherein said selected ones of said plurality of support members are inflatable, wherein said movement establishing means includes means for permitting inflation of said selected ones of said plurality of support members, and wherein said control means includes regulator means for regulating fluid flow into said plurality of support members to thereby adjustably control the pressure exerted at said different areas of said body of a user when seated on said seating device and to thereby vary said provided support.

3. The assembly of claim 1 wherein all of said support members include movement establishing means, and wherein said control means causes a first part of said movement establishing means to be moved during one time period and a second part of said movement establishing means to be moved during a second time period later than said first time period.

4. The assembly of claim 3 wherein said control means causes said varying of the support provided to a body of a user when seated on said device during repeated said first and second time periods to thereby promote blood circulation and reduce fatigue associated with prolonged periods of being seated on said seating device.

5. The assembly of claim 1 wherein said first section extends beyond the front of said seat unit of said seating device.

6. A varying support cushioned assembly for a seating device having a seat unit having sides and front and rear edges, and a back unit having sides and upper and lower edges, said cushioned assembly comprising:

a first section including first inflatable means having a plurality of spaced first support chambers extending at least partially across said seat unit of said seating device between said sides of said seat unit, and second inflatable means having spaced second support chambers extending at least partially across said seat unit of said seating device between said sides of said seat unit with a different one of said second support chambers being positioned between adjacent ones of said first support chambers so that said first and second inflatable means cooperatively provide cushioned support to different areas of the body of a user when seated on said seat unit of said seating device with said first and second support chambers positioned between said body and said seat unit, said first section extending substantially from said rear edge of said seat unit to and over said front edge of said seat unit so that at least one of said first and second support chambers are between said front edge and the body of a user when seated on said seating device, and said first section also including first and second input means adjacent to said rear edge of said seat unit and adapted to receive an inflating fluid, and first and second manifold means for separately connecting said first and second input means with different ones of said first and second inflatable means so that said first and second support chambers can be progressively inflated with said first and second support chambers nearest said rear edge of said seat unit being inflated first and said at least one of said first and second support chambers between said front edge of said seat unit and the body of a user being inflated last;

a second section including third inflatable means having a plurality of spaced third support chambers extending at least partially across said back unit of said seating device between said sides of said back unit, and fourth inflatable means having spaced fourth support chambers extending at least partially across said back unit of said seating device between said sides of said back unit with a different one of said fourth support chambers being positioned between adjacent ones of said third support chambers so that said third and fourth inflatable means cooperatively provide cushioned support to different areas of the body of a user when seated on said seating device with the back of the user exerting pressure on said third and fourth support chambers positioned between said back of the user and said back unit of the seating device, at least one support chamber of each of said plurality of spaced third and fourth support chambers nearest to said lower edge of said back unit of said seating device having a larger cross section when inflated than do others of said support chambers so that said at least one support chamber of each of said plurality of third and fourth support chambers nearest to said lower edge of said back unit extends further from said back unit and toward a user when inflated than said others of said support chambers when inflated whereby support is provided to the lumbar region of the spine of said back of the user, and said second section also including third and fourth input means near said lower edge of said back unit and adapted to receive an inflating fluid, and third and fourth manifold means for separately connecting said third and fourth input means with different ones of said third and fourth inflatable means so that said third and fourth support chambers can be progressively inflated with said third and fourth support chambers nearest to said lower edge of said back unit being inflated first and said third and fourth support chambers nearest to said upper edge of said back unit being inflated last; and control means adapted to be connected with a supply of said inflating fluid and connected with said input means for alternately causing inflation and at least partial deflation of said first and second inflatable means and said third and fourth inflatable means at selected intervals so that when one of said first and second inflatable means is inflated the other of said first and second inflatable means is at least partially deflated, and when one of said third and fourth inflatable means is inflated the other of said third and fourth inflatable means is at least partially deflated, whereby said cushioned support provided to a user is continuously varied with respect to said areas of the body of the user supported by said support sections of said assembly, blood circulation is enhanced through said different areas of the body of the user normally in contact which said seat unit when seated thereon and to outer extremities of said body of a user, and massaging action is provided to said lumbar region of the spine of a user by said alternate inflation and at least partial deflation of said at least one support chamber of each of said plurality of spaced third and fourth support chambers nearest to said lower edge of said back unit.

7. The cushioned assembly of claim 6 wherein said support chambers comprise elongated inflatable compartments positioned substantially parallel with respect to each other, and wherein said manifolds extend substantially normal to said chambers and adjacent to said side edges of said seat of said seating device.

* * * * *